No Printed Specification Available
6241X
E. Rhodes,
Spoke Lathe.
Patented Nov. 11. 1830.
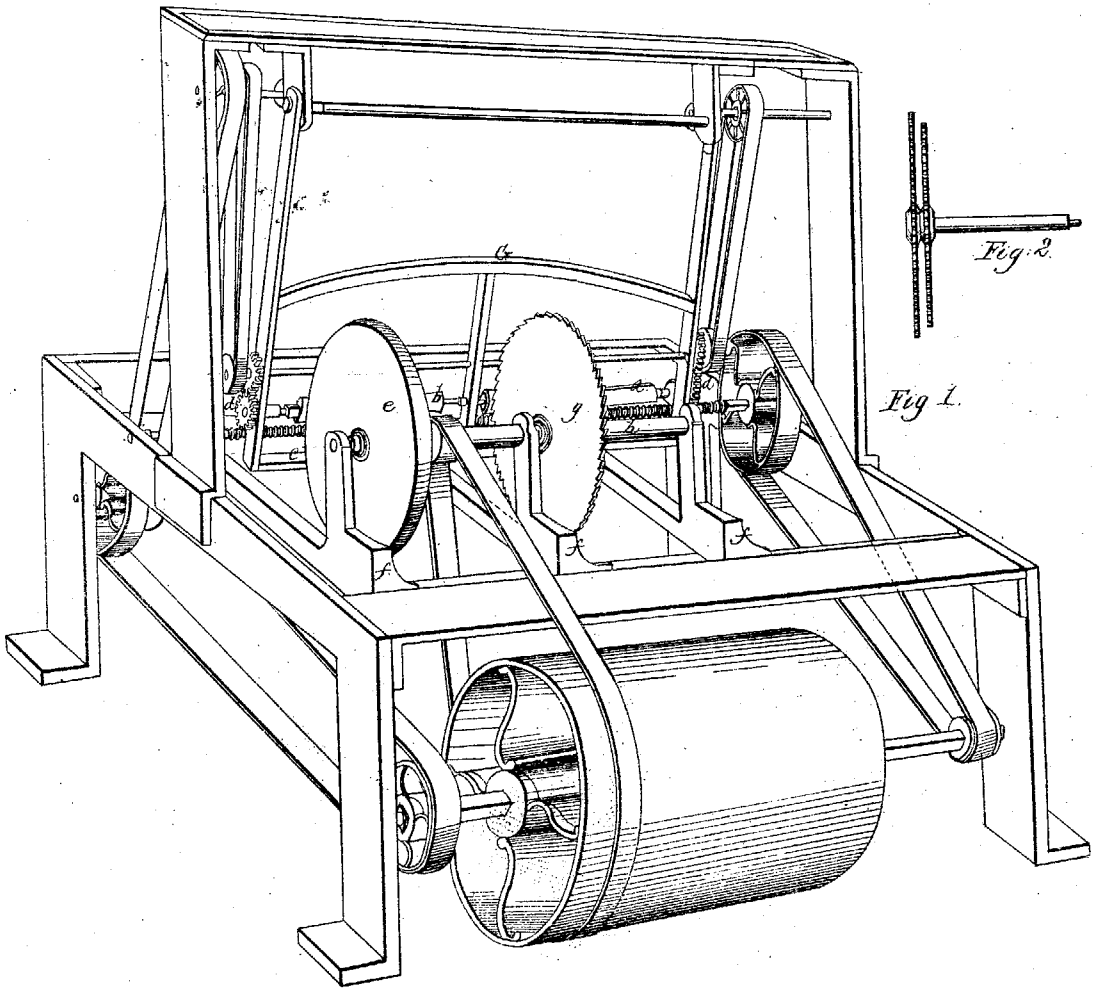

[illegible] Rhodes of [illegible] New York
[illegible] Nov 11, 1830

The Schedule referred to in these Letters Patent and making part of the same
containing a description in the words of the said Elias Rhodes himself of his improve
ment in the Lathe.

To all to whom these presents shall come Be it known that I Elias Rhodes
of the Town of [illegible] in the County of Washington and State of New York
have invented a new and useful improvement in the Lathe for shaping
various articles of irregular form according to a pattern and that the follow-
ing is a full and exact description of the construction and operation of the
said improvement. That species of Lathe to which this improvement is
applicable has been in use for a number of years past for the shaping of Gun-
Stocks and other articles of irregular structure according to the pattern of the
article to be formed. The general principle of its operation is well understood
and will therefore require but a brief description.
" The rough piece of wood to be shaped and the pattern are both placed
at a suitable distance from each other in a frame capable of vibratory motion. They
have each a slow rotary motion exactly alike produced by a suitable pinion at one
end of each. As the pattern revolves it is made to come in contact with the edge of a smooth cast iron
wheel which will cause the frame to vibrate backward and forward according to various
irregularities in the pattern. The stock to be shaped at the same time comes in contact with
a wheel which revolves with great rapidity to whose circumference is attached numer-
ous cutters to operate on the wood. These two wheels are attached to the same frame &
constantly retain the same relation to each other. The frame which sustains them
is made to move slowly from one end of the stock to the other so that every part is
operated upon and brought to the shape of the pattern.
My improvement consists in using one or more circular saws in the place of cut
ters heretofore used. When one saw is used it is fixed upon an arbor [illegible] of the cutting
wheel [illegible] and [illegible] like it only that in regulating its progressive lateral mo-
tion reference must be had to the thickness of the saw. That is it must not move so fast
as to prevent the saw cutting its way clear. When the shape of the article to be formed
is such as to make it necessary to cut through any considerable thickness of wood, it is

[illegible] X6241 bit to have two or more saws upon the same axis the [illegible] foremost smaller than the next one to it. that the first saw may cut away a portion of the timber before the next one reaches it. What I claim is the application of one or more circular saws to the above described Lathe for the purpose of shaping Oxe yokes Waggon spokes or any other articles which may be shaped therein excepting Last and Hat blocks. Sandy Hill September 22, 1831

Exd. Witness

W.J.H. John Moss

Simeon Berry

Elias Rhodes (592 w[illegible]